L. B. HOLLIDAY, E. J. WEIDENSALL & G. R. KREBS.
ELECTRIC STEAM GENERATOR OR HUMIDIFIER.
APPLICATION FILED MAR. 22, 1910.
990,875.
Patented May 2, 1911.
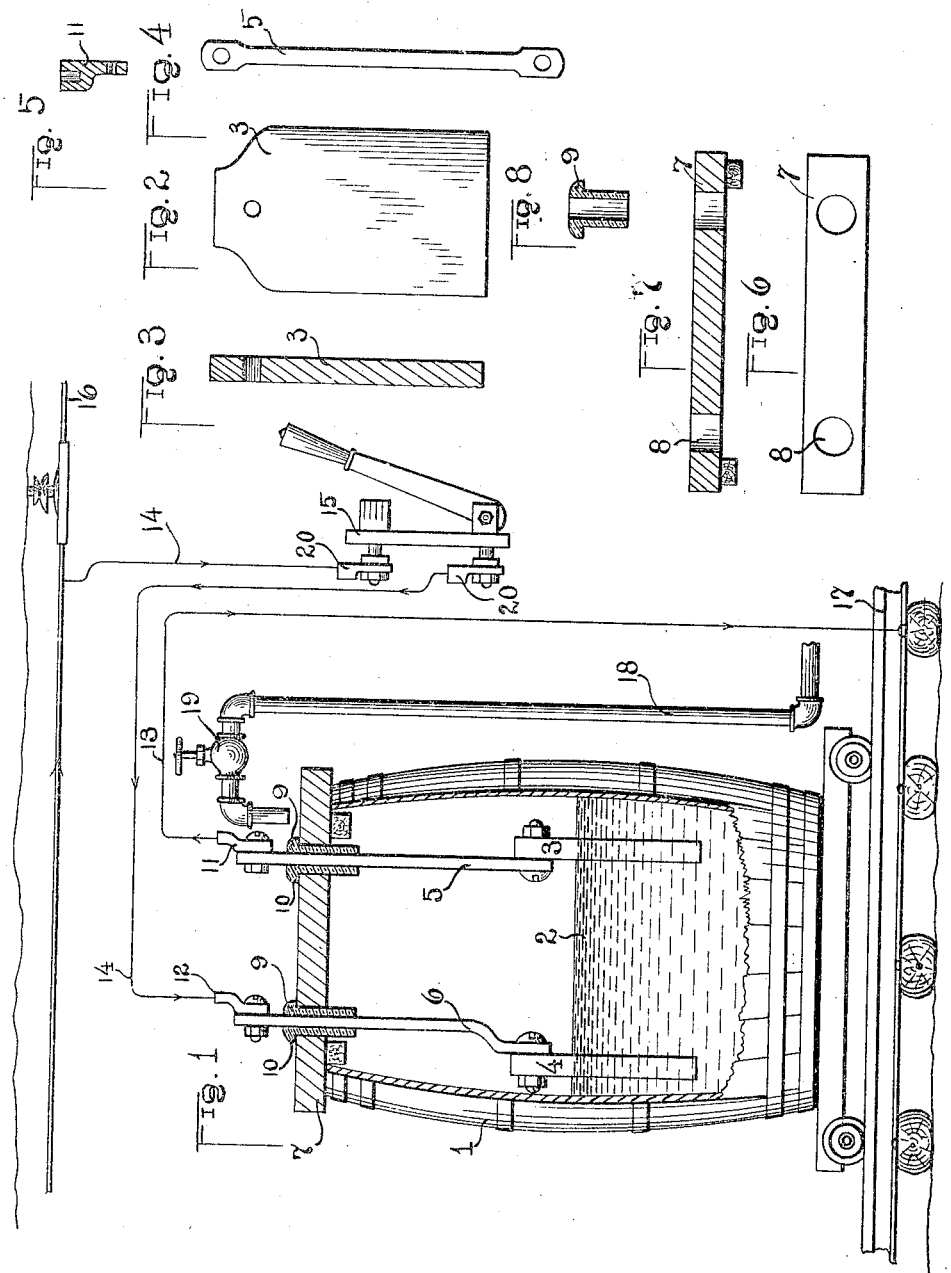

UNITED STATES PATENT OFFICE.

LANCELOT B. HOLLIDAY, OF BECKLEY, AND EDWARD J. WEIDENSALL AND GEORGE R. KREBS, OF WICKHAM, WEST VIRGINIA.

ELECTRIC STEAM-GENERATOR OR HUMIDIFIER.

990,875.  Specification of Letters Patent.  Patented May 2, 1911.

Application filed March 22, 1910. Serial No. 550,839.

*To all whom it may concern:*

Be it known that we, LANCELOT B. HOLLIDAY, residing at Beckley, and EDWARD J. WEIDENSALL and GEORGE R. KREBS, residing at Wickham, in the county of Raleigh, State of West Virginia, citizens of the United States, have invented certain new and useful Improvements in Electric Steam-Generators or Humidifiers; and we do hereby declare the following to be a full, clear, and exact description of the invention, such as will enable others skilled in the art to which it appertains to make and use the same.

Our invention relates to new and useful improvements in means for heating water by electricity and our object is to provide a receptacle for holding the water.

A further object is to provide means for conveying an electric current into the receptacle and causing the same to traverse the water therein, whereby the water will become heated, and, a further object is to provide suitable insulators for the parts through which the electric circuit passes.

Other objects and advantages will be hereinafter referred to and more particularly pointed out in the specification and claims.

In the accompanying drawings which are made a part of this application, Figure 1 is a detail elevation partly in section of our improved heating mechanism applied to use. Fig. 2 is an elevation of one of the plates or carbons employed for conducting the electricity into the water. Fig. 3 is a central sectional view thereof. Fig. 4 is an elevation of one of the rods employed for supporting the carbons. Fig. 5 is a sectional view of one of the contact plates. Fig. 6 is a top plan view of a supporting bar for the carbons. Fig. 7 is a central longitudinal sectional view thereof, and, Fig. 8 is a sectional view of one of the insulators used in connection with the supporting bar.

Referring to the drawings in which similar reference numerals designate corresponding parts throughout the several views, 1 indicates a receptacle, which may be constructed in any preferred manner and of wood or metal, said receptacle being adapted to contain water, as shown at 2. In order to heat the water or evaporate the same, as occasion may require, carbon plates 3 and 4 are entered into the receptacle 1 and have their lower ends disposed into the water, while to the upper ends thereof are secured supporting rods 5 and 6 respectively.

The upper ends of the rods 5 and 6 project through a supporting bar 7, said bar resting across the top of the receptacle 1 and is provided with openings 8 through which the rods pass.

The rods are insulated from the bar 7 by means of the usual or any preferred form of insulating tubes 9, which tubes fit in the openings 8 and surround the rods 5 and 6, the upper ends of the tubes having shoulders 10 thereon by means of which the downward movement of the tubes is limited.

Attached to the upper ends of the rods 5 and 6 are binding posts or plates 11 and 12, to which are attached the ground and live wires 13 and 14 respectively. Intersecting the live wire 14 is a switch 15, which is constructed in the usual or any preferred manner, the opposite end of the wire 14 being in this instance connected to a trolley wire 16, but it will be clearly understood that any suitable source of electric supply may be used.

This invention is adapted more particularly to be used in mines for increasing the moisture therein and when so applied, the receptacle 1 may be, if desired, mounted upon trucks whereby it may be moved from point to point in the mine. As shown in Fig. 1 of the drawing, the ground wire 13 is connected to one of the rails 17 of the trackway in the mines.

The water for the receptacle may be supplied in any suitable manner, but for a matter of illustration, we have shown a pipe line 18, the end of which terminates over the upper end of the receptacle 1 and is provided with a valve 19 to control the flow of the water through the pipe.

The sections of the live wire 14 are attached to binding posts 20 on the switch 15 and these binding posts are preferably constructed of brass.

In operation, the switch lever is thrown into engagement with the contact points on the switch, whereupon the current will pass through the wire 14 from the trolley wire 16, through rod 6 and carbon plate 4, thence through the water in the receptacle and into the plate 3, from whence it passes through the rod 5 and wire 13 to the ground. The forcing of the current through the water in the receptacle will cause said water to become heated and if a sufficient amount of the current is passed through the water, said water will boil, thus creating moisture in the mine, or if the receptacle is inclosed, the steam will be generated and stored for use. When the steam created by the electricity is stored for power or heating purposes, the receptacle is necessarily formed of metal, in which instance the interior thereof is lined with any suitable form of insulating substance such as porcelain or the like, as otherwise the receptacle would become electrically energized and the water should be substantially free of mineral products in order to obtain the proper heating qualities of the electricity.

What we claim is:—

An electrical heating appliance, comprising the combination with a receptacle, of a supporting member adapted to extend across the upper end of said receptacle, a pair of supporting rods extending through said supporting member and insulated therefrom, terminals secured to the upper ends of said supporting rods, the lower ends of said rods being apertured, a pair of electrodes, and bolts extending through the apertures in said rods and through said electrodes to removably secure said rods and electrodes together.

In testimony whereof we have signed our names to this specification in the presence of two subscribing witnesses.

LANCELOT B. HOLLIDAY.
EDWARD J. WEIDENSALL.
GEORGE R. KREBS.

Witnesses:
ANTHONY LEWIS,
J. B. ROBERTSON.